US006816116B2

(12) United States Patent
Chen

(10) Patent No.: US 6,816,116 B2
(45) Date of Patent: Nov. 9, 2004

(54) SMART ANTENNA FOR PORTABLE DEVICES

(75) Inventor: Michael Chen, Taipei (TW)

(73) Assignee: Quanta Computer, Inc., Tao Yuan Shien (TW)

(*) Notice: Subject to any disclaimer, the term of this patent is extended or adjusted under 35 U.S.C. 154(b) by 0 days.

(21) Appl. No.: 10/264,210

(22) Filed: Oct. 3, 2002

(65) Prior Publication Data

US 2003/0179138 A1 Sep. 25, 2003

Related U.S. Application Data

(60) Provisional application No. 60/366,875, filed on Mar. 22, 2002.

(51) Int. Cl.[7] .................................................. H01Q 3/26
(52) U.S. Cl. ........................................ 342/372; 342/374
(58) Field of Search .............................. 342/372, 373, 342/374; 333/157, 159

(56) References Cited

U.S. PATENT DOCUMENTS

| | | | |
|---|---|---|---|
| 5,218,358 A | * | 6/1993 | Harrington et al. ......... 342/372 |
| 5,617,102 A | | 4/1997 | Prater |
| 6,009,124 A | | 12/1999 | Smith et al. |
| 6,252,542 B1 | * | 6/2001 | Sikina et al. ............... 342/174 |
| 6,349,217 B1 | | 2/2002 | Honcharenko et al. |
| 6,362,790 B1 | | 3/2002 | Proctor, Jr. et al. |
| 6,369,770 B1 | | 4/2002 | Gothard et al. |
| 6,369,771 B1 | | 4/2002 | Chiang et al. |

FOREIGN PATENT DOCUMENTS

EP       1079296      2/2001

OTHER PUBLICATIONS

Standard Antenna Terms and Related Formulas.
What is a Wireless LAN?.
NTT Network Innovation Laboratories: Smart Antennas.
Array Processing for Wireless Communications (Björn Ottersten).
Application of Smart Antenna Technology in Wireless Communication Systems (Richard H. Roy).
Smart Antenna Systems.
An Overview of Smart Antenna Technology for Mobile Communications Systems (Per H. Lehne & Magne Pettersen).

* cited by examiner

*Primary Examiner*—Bernarr E. Gregory
*Assistant Examiner*—Fred H Mull
(74) *Attorney, Agent, or Firm*—Liu & Liu

(57) ABSTRACT

A dynamically reconfigurable antenna system is disclosed which may be configured with low cost discrete analog components. Particularly, the antenna elements, phase shifters, and beam forming network of the current smart antenna system are configured from RF transmission lines, RF couplers and RF switches in a system which is able to dynamically reconfigure its beam forming signals to point in a direction of greatest signal strength. The smart antenna system may be configured on portable devices to accomplish greater signal reception and transmission when used in a wireless network.

29 Claims, 7 Drawing Sheets

SMART ANTENNA FOR PORTABLE DEVICES

This application claims the benefit of Provisional Application No. 60/366,875, filed Mar. 22, 2002.

BACKGROUND OF THE INVENTION

1. Field of the Invention

This invention relates generally to a dynamically reconfigurable antenna system. More specifically this invention provides a reconfigurable antenna system configured using discrete microwave components which is capable of directing an antenna beam in the direction of greatest signal gain. A smart antenna for portable devices is disclosed which will scan antenna beams to locate the target direction, then re-configure the antenna beam and point the antenna beam to the target direction.

2. Description of Related Art

Conventional antenna systems which may be reconfigured (commonly known as "smart antennas") to adapt the directionality of their beams such that a maximum incoming and/or outgoing signal is achieved have typically involved many high cost and difficult to implement digital circuitry components. Particularly, the phase arrays commonly used to selectively route signals and beamform on one or more antennas have utilized signal converters and digital signal processors (DSP's) to electronically process each signal, often multiple times during antenna pointing. Additionally, the beam forming networks in conventional antenna systems typically rely on similar digital signal processing elements. Such DSP chips and other electronic components are costly to manufacture and implement in devices compared to discrete microwave components. Additionally, discrete components can also be configured more compactly, enabling smart antenna systems of smaller size that current DSP based systems. Therefore, it would be desirable to create a new low cost and easy to implement smart antenna system which uses for its phase array and beam forming network elements a combination of discrete microwave (analog) components.

SUMMARY OF THE INVENTION

The smart antenna system of the current invention may be configured using currently existing and relatively inexpensive microwave components to form phase shifters and switches which form the phase array and beam forming network elements of a smart antenna system. When coupled with a wireless local area network (WLAN) device containing a simple processing unit, signals from the phase array may be processed to determine directionality, and appropriate beam forming signals may be routed through the beam forming network and out an antenna to point the signal. One or more antenna elements are configured such that spatial pointing of beams in opposing directions is possible. A radio frequency (RF) transmission line leads from each antenna element to RF couplers which form a phase shifter for each antenna element. RF switches corresponding to the number of coupler elements in each phase shifter are configured to work with the phase shifters and can be selectively operated to pass signals from each coupler line. To enable beam forming and routing of signals to a WLAN device, a beam forming network (BFN) switch is included which connects with each phase shifter of the phase array.

In one aspect of the current invention, separate phase shifter controller and beam forming network controller elements are included which processing signals from the WLAN device to selectively enable the switching elements of the system.

In another aspect of the current invention, the phase shifter controller and beam forming network controller are included in the WLAN device as functional elements which process signals and selectively enable the switching elements of the system to accomplish beam pointing.

This invention has been described herein in reference to various embodiments and drawings. While this invention is described in terms of the best presently contemplated mode of carrying out the invention, it will be appreciated by those skilled in the art that variations and improvements may be accomplished in view of these teachings without deviating from the scope and spirit of the invention. This description is made for the purpose of illustrating the general principles of the invention and should not be taken in a limiting sense.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The present description is of the best presently contemplated mode of carrying out the invention. This description is made for the purpose of illustrating the general principles of the invention and should not be taken in a limiting sense. The scope of the invention is best determined by reference to the appended claims.

All publications referenced herein are fully incorporated by reference as if fully set forth herein.

The present invention can find utility in a variety of implementations without departing from the scope and spirit of the invention, as will be apparent from an understanding of the principles that underlie the invention. It is understood that the reconfigurable antenna concept of the present invention may be applied for portable devices or any kind including laptop computer, cellular phones, personal digital assistants, etc. It is also understood that while the present invention is best explained in reference to portable computer devices, it will nonetheless have broad application in all areas of wireless communications.

System Overview/Design Considerations

One goal of this present invention is to provide a low cost, easily configurable smart antenna system for use in portable devices. The smart antenna system of the current invention provides a low cost, small scale reconfigurable antenna system for use in portable devices which enables pointing of antenna beams in a direction of greatest signal strength by using relatively inexpensive discrete analog components throughout the antenna array, phase array, and beam forming network. In so doing, expensive digital chips and components are not required to perform phase processing and routing functions of signal components through the system.

Figure 2:
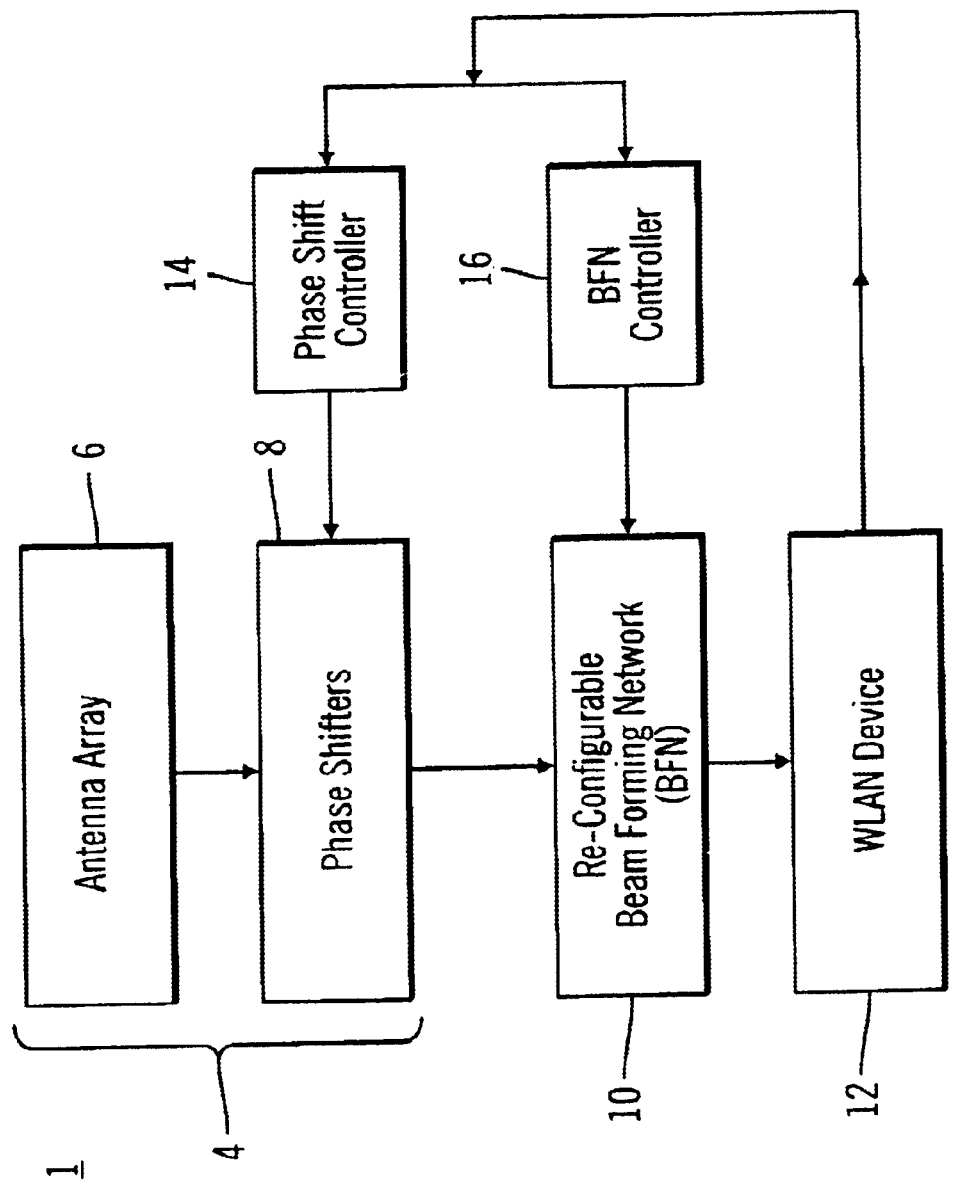
FIG. 2 is a schematic representation of the phase array, beam forming network, controllers, and WLAN device.

In general, the system comprises an antenna array, phase array, beam forming network, WLAN device and one or more controller devices. As indicated above, the components of the antennas elements of the array, phase shifters of the phase array, and switches forming the beam forming network are all configured with discrete RF analog components rather than expensive DSP units and associated electronics. The WLAN device (which is generally any WLAN device used in wireless communications systems) contains transceiver and processing elements for converting the signals, determining signal direction, filtering interfering signals from the system and performing network security functions. Looking now to FIG. 2, the smart antenna system 1 of the current invention is shown schematically. Antenna array 6 serves as the conduit through which signals enter and exit the system. Phase shifter 8 functionally performs phase dependent routing on incoming signals from each antenna. Phase array 4 is the functional element made up of antenna array 6 and phase shifters 8, which together form a signal path from each antenna element which is entirely analog. The reconfigurable beam forming network 10 consists in a series of switches which operate to route incoming signals to the WLAN device 12, and conversely to switch outgoing signals to the appropriate phase shifter and antenna elements for directional beam formation. WLAN device 12 receives signals from the beam forming network 10, converts the signal to digital information for processing, and performs a variety of algorithmic functions to determine signal direction, filter out unwanted signal interference, perform security identification functions, and send control signals to various controller devices. In FIG. 2, beam forming network controller 16 and phase shifter controller 14 are shown connected to WLAN device 12. Beam forming network controller 16 is operatively connected with the switches of beam forming network 10 to route incoming and outgoing signals. Phase shifter controller 14 is operatively connected to the switches of phase array for performing signal routing functions.

Though all of the above elements are necessary to form a "smart antenna" system, this present invention primarily concerns a configuration of the phase array and beam forming network using all discrete analog components rather than digital circuitry. It will be understood by those skilled in the art that such a configuration could be implemented with a wide variety of antenna elements, WLAN devices, and controller devices without departing from the spirit and scope of the present invention.

In the current system, components and elements throughout the antenna array, phase shift array, and beam forming network are discrete microwave components such that RF signals within those elements never undergo analog to digital (A/D) conversion before the WLAN device. Likewise, an outgoing analog signal generated by the WLAN device would not undergo any A/D conversion as it travels out the beam forming network and antenna elements. No specific physical configuration of the smart antenna system is required by the current invention other than the use of discrete RF components for the antenna array, phase array, and beam-forming network. It would be possible to configure or engineer such discrete components and system elements on a single (modular or fixed) substrate to accomplish the beam forming functions of the system. It is also possible that systems may be configured which include both controller elements and all discrete components on a single substrate, or an even more integrated system which includes a WLAN device with controllers and all discrete components of the smart antenna on a single substrate.

In some systems it may be desirable to locate antennas in different physical areas than the rest of the system for optimal reception and beam forming, so in those cases some or all antennas will not be co-located with the rest of the system. It is also contemplated, concerning the actual physical implementations of the current system, that several different permutations of the above configurations are possible (eg. a system which includes several antennas both on and outside the substrate, controllers on substrate, and separate WLAN device operatively connected with system) without departing from the spirit or scope of the current invention.

Figure 1:
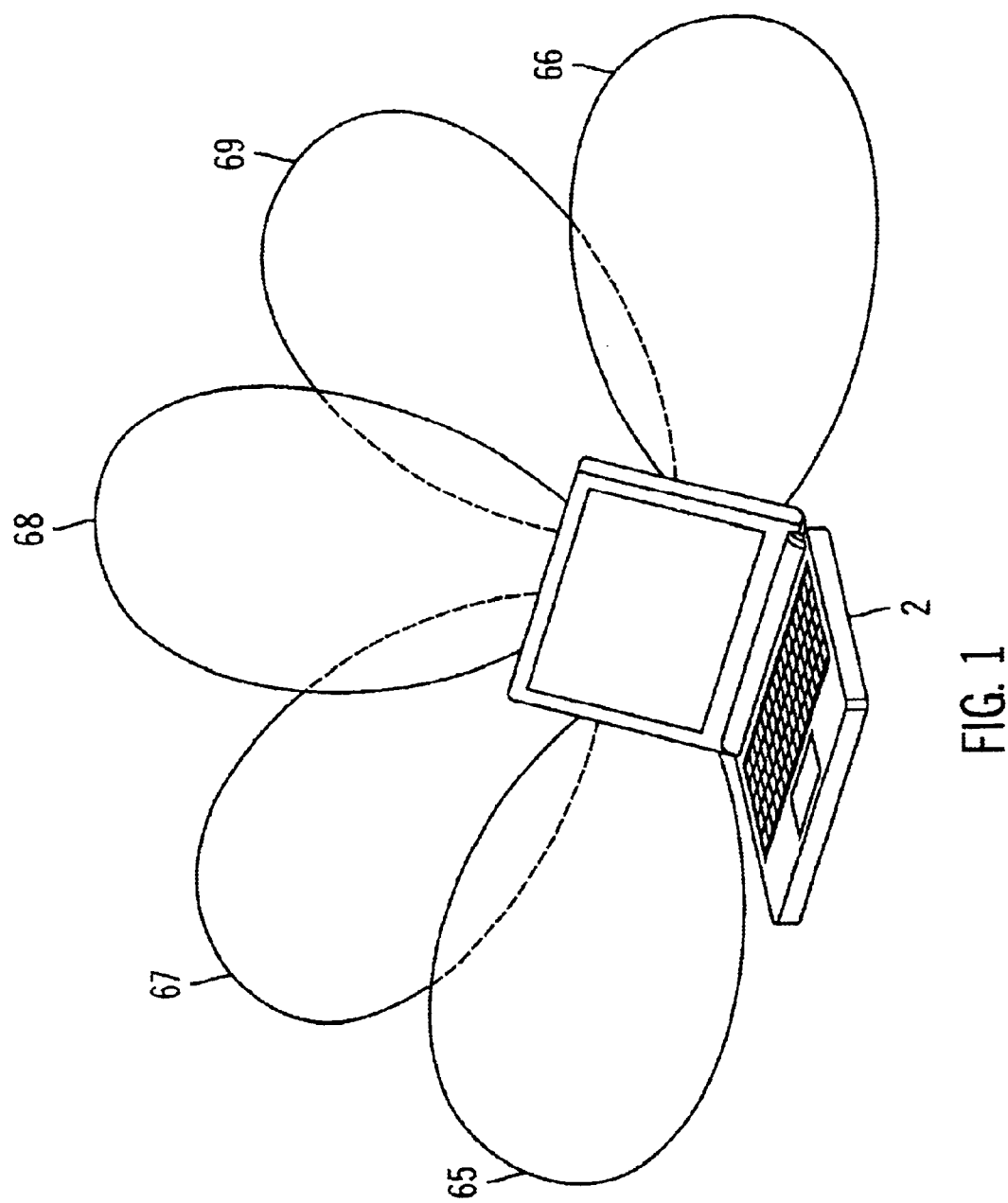
FIG. 1 is a graphical representation of 5 configurable antenna beams extending from a portable device.
Figure 3:
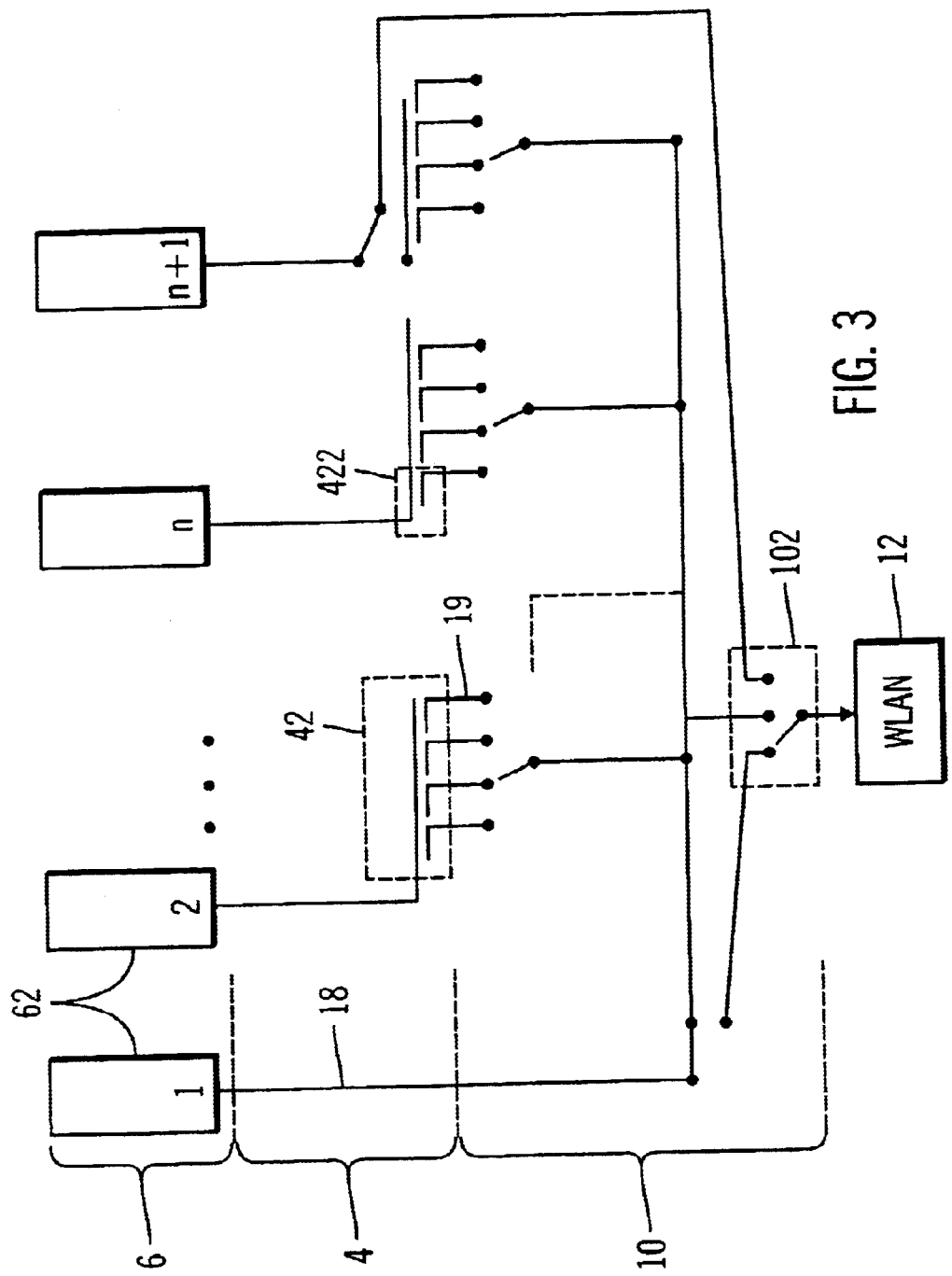
FIG. 3 is a schematic representation of the antenna elements and associated microwave switches.
Figure 4:
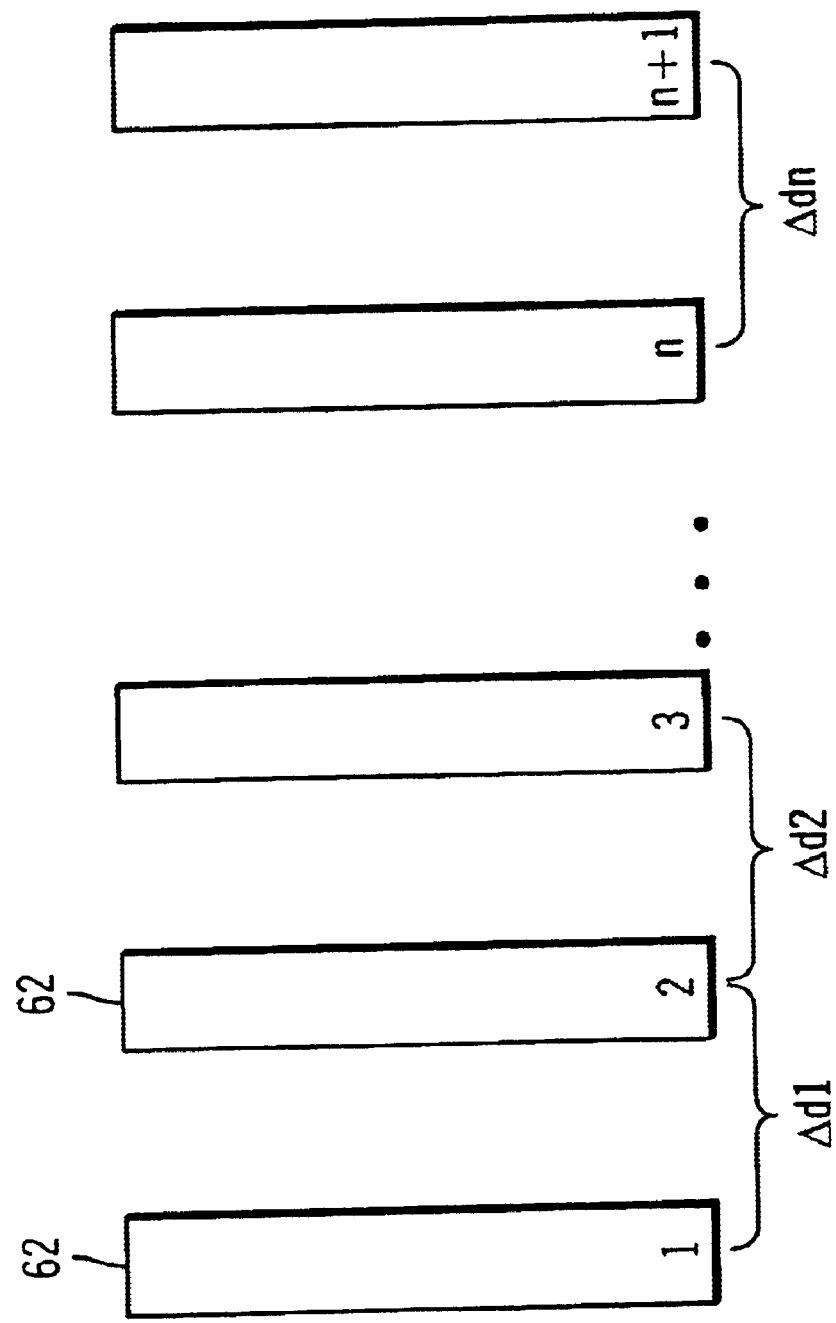
FIG. 4 is a schematic representation of the antenna array.

Antenna Array:

Looking now to FIGS. 2–4, the antenna array 6 of the current invention can be any number or configuration of individual antenna elements 62. Antenna elements 62 are RF devices capable of transmitting and receiving RF signals. FIG. 1 shows the five beams formed by antennas configured in a portable computing device 2. In accordance with one aspect of this invention, beams 65 and 66 correspond to fixed directional antennas ("fixed antennas") which are oriented in opposite directions with respect to portable computing device 2. Beams 67, 68, and 69 are directional antennas offset by angular separations (typically 120 degrees between antennas) which may also be further pointed by varying the phase components of outgoing RF signals ("pointing antennas"). The gain of these pointing antennas may by augmented (typically by 4–6 dB) to provide a stronger signal in the desired direction during pointing operations. It is also possible to adaptively point a beam by using more than one of the directional beams from antenna elements 67–69 in combination to create a beam that may be pointed more precisely. It should be noted that while a system having one antenna element which may be pointed is possible to implement with the current system, the degree of pointing accuracy and ability to maintain a strong communication signal is greatly improved by the implementation of multiple antennas, preferable five or more, to yield optimal results. It will be understood by those skilled in the art that any number of antenna elements may be used in the current system without departing from the spirit and scope of the current invention.

The physical orientation of the antenna array and the particular geometry of antenna elements on a portable device can vary widely within the scope of the current invention. In one example system, the antenna elements 62 as shown in FIG. 4 are elongated cylindrical antennas configured in a parallel fashion each separated by distance d (typically half wave length in the example system). This configuration may optimally be placed on the backside of a display panel on a portable device such as the portable computing device 2 shown in FIG. 1. It would also be possible to configure directional antenna elements, of any geometry, in other locations about a portable device to accomplish an antenna array. In general, considerations such as the amount of interference caused or experienced by antenna elements in a certain system locations, the ability to route signals effectively to the phase array, and physical size requirements will determine the optimal configuration of antenna elements in a given system. For different portable devices it will also be understood that certain antenna elements and antenna arrays will be optimal given the above considerations and other design requirements.

Figure 5:
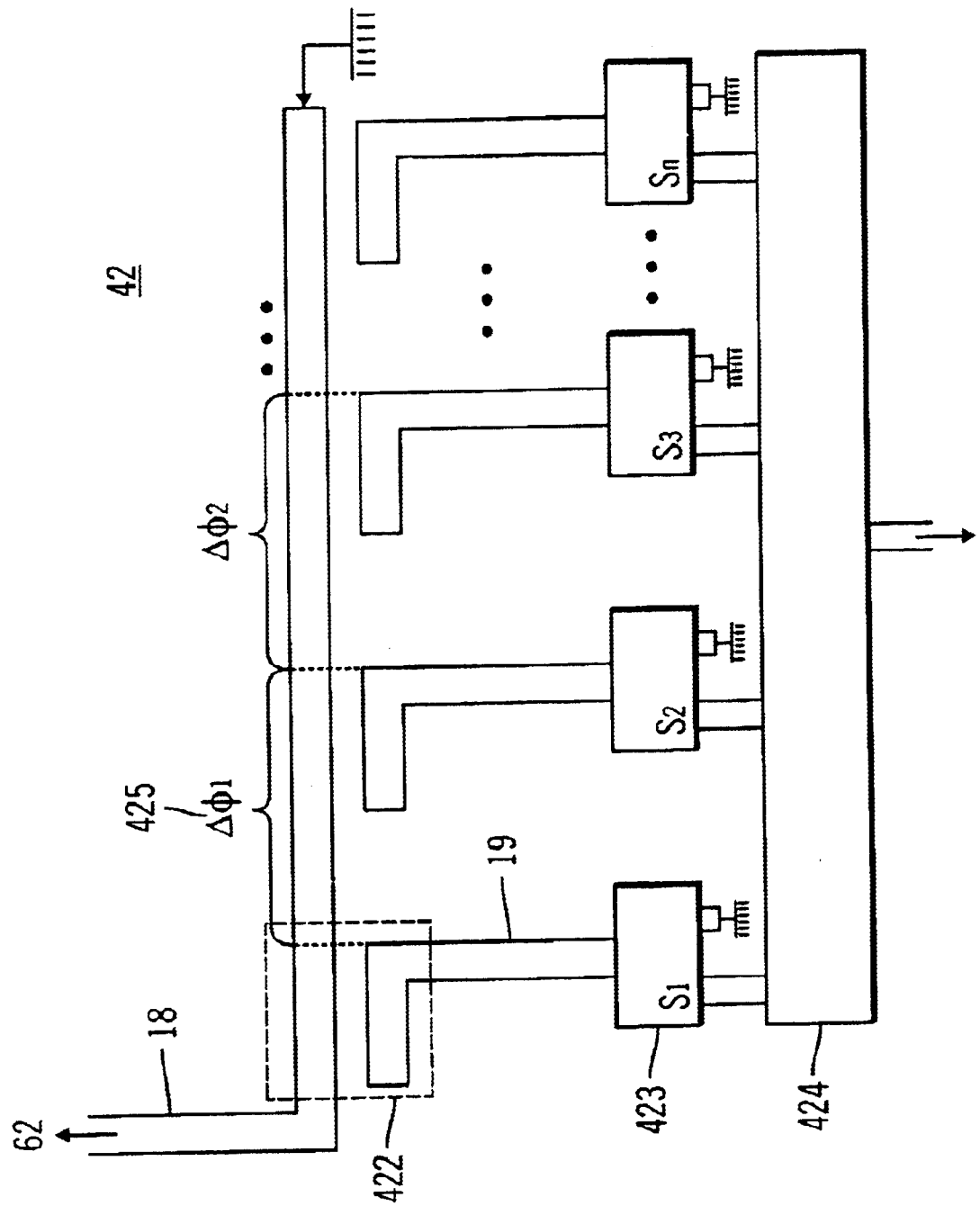
FIG. 5 is a schematic representation of the phase shifter configuration.

Phase Array:

According to the current invention, the phase array is configured using discrete analog components such as RF transmission lines, RF couplers, and RF switches. The phase array 4 shown in FIG. 3 includes a number of phase shifters 42 coupled via RF transmission lines 18 to the individual antenna elements 62 of antenna array 6. The operative principle behind phase array 4 is that signals incident the antenna array will have phase components corresponding to their direction of incidence on each directional antenna element. As the signal is incident the antenna, each directional antenna element receives a different phase component of the signal which travels through the system along each corresponding RF transmission line. RF couplers along the RF transmission line are offset by a distance (corresponding to the wavelength of the incoming signal) such that each signal component (of varying signal strength) will be routed through phase transmission lines 19 to RF switches 424 as shown in FIG. 5. The RF switches 424 and switch 102 may be selectively operated in a scanning function to pass individual signal phase components to the WLAN device for processing. Upon the completion of one system scan (typically the transmission of all individual signal phase components from each phase shifter 42 to the WLAN device) the WLAN device may process the individual signal components to determine the direction of greatest signal strength.

Looking now at FIG. 5 which shows a schematic view of phase shifters 42, RF transmission line 18 is the conduit through which signals to and from the antenna elements 62 travel. Transmission line 18 may be coaxial cable, strip line, or any other conventional RF transmission waveguide or conduit. RF couplers 422 are placed along RF transmission line 18 each separated by distance 425 corresponding to the phase difference of network signals. RF couplers 422 may be slot couplers or any other type of conventional RF coupling device. A number of RF couplers are configured along the RF transmission line to transmit a maximized portion of the signal phase components. In general, a greater number of RF couplers will yield more accurate directional determinations and signal pointing as more signal phase components will be available for system processing in the WLAN device and conversely for transmitting outgoing signals having phase components. Conversely, a system having less RF couplers and thus signal phase components available for processing will be easier to configure and perform beam forming tasks, thus enable systems which may operate more rapidly to dynamically determine signal direction and reconfigure antenna beams to point in the direction of greatest gain.

Each RF coupler 422 is routed to a single port of RF switches 423 via phase transmission lines 19, which may be configured with similar materials as RF transmission lines 18. Switch 424 may then be operated to selectively transmit signals from each of the switches 423. Switches 423 may be operated to ground RF signals rather than passing them on to switch 424. It will generally be desirable to use switches having low insertion losses and fast switching times such that effective beam scanning and beam forming functions of the system are possible.

Figure 6:
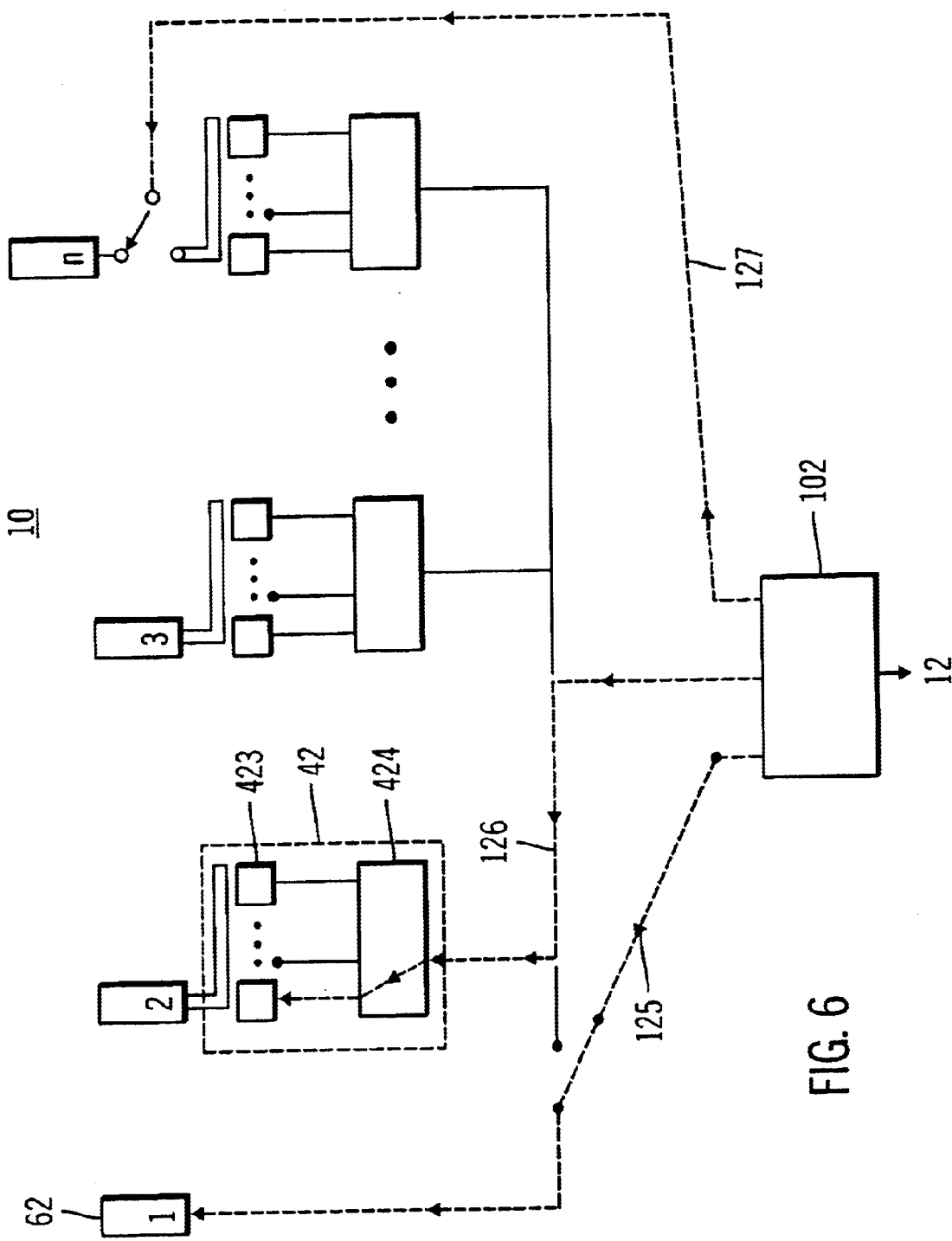
FIG. 6 is a schematic representation of the re-configurable beam forming network.

Beam Forming Network:

The beam forming network 10 of the current system functions to route signals appropriately from the WLAN device through each of switches to effectuate beam pointing in one or more antennas as shown in FIG. 6. In general three possible signal routing scenarios are possible with the current system. In the first scenario 125, antenna element 62 is routed via a transmission line 18 directly to switch 102. It is thus possible for switch 102 to pass outgoing RF signals directly to antenna element 62 without passing through any phase shifters. In this way the switch 102 may circumvent the phase array to pass signals if desired for a particular system configuration. In the second scenario 126, outgoing signals from the WLAN device are routed through switch 102 to a phase shifter 42 as shown. Switches 424 and 423 of the phase shifter 42 may then be selectively operated to route the signal through RF couplers of the phase shifter and an antenna element. This scenario details a signal pointing operation of the system in which a signal "lobe" from the antenna element with substantial "directional pointing" component may be formed in the desired direction. Scenario 127 shows switch 102 routed around a phase shifter rather than through it. It may desirable to use such a configuration in the beam forming network to add routing options for outgoing signals such that the directional pointing of antennas may be performed in the least amount of time. It will be appreciated by those skilled in the art that a variety of the switching and routing functions described above may be used in a particular beam forming network depending on system design and requirements without departing from the spirit and scope of the current invention.

Switches 102, 424, and 423 of the beam forming network are multi-port RF switches (such as any conventional RF switch) which may be operated by electronic signals and configured in a traditional electronic circuit. Control devices such as the beam forming network controller 16 and phase shifter controller 14 may be used to determine and control the exact operation and logic of switches to effectuate routing of signals.

WLAN Device:

The WLAN device of the current invention provides the signal conversion (A/D D/A), processing (CPU), filtering, and security functions as well as providing command signals to other system elements (such as control devices). As such the WLAN device is a transceiver and processing device which is configured with various software and hardware elements to accomplish the required functions. The WLAN device will process the signal from the beam forming network and filter out the un-wanted signal such as signals with the wrong ID, and send the information of the correct signal (such as signal strength and signal to noise ratio) to the control device. Additionally, the WLAN device may be any known or currently used WLAN device which may be configured to work with the phase array and beam forming network of the current invention. In general, the phase array and beam forming network elements of the current invention may be configured to work with any WLAN device and as such present a flexible smart antenna system which is cost effective and small.

Figure 7:
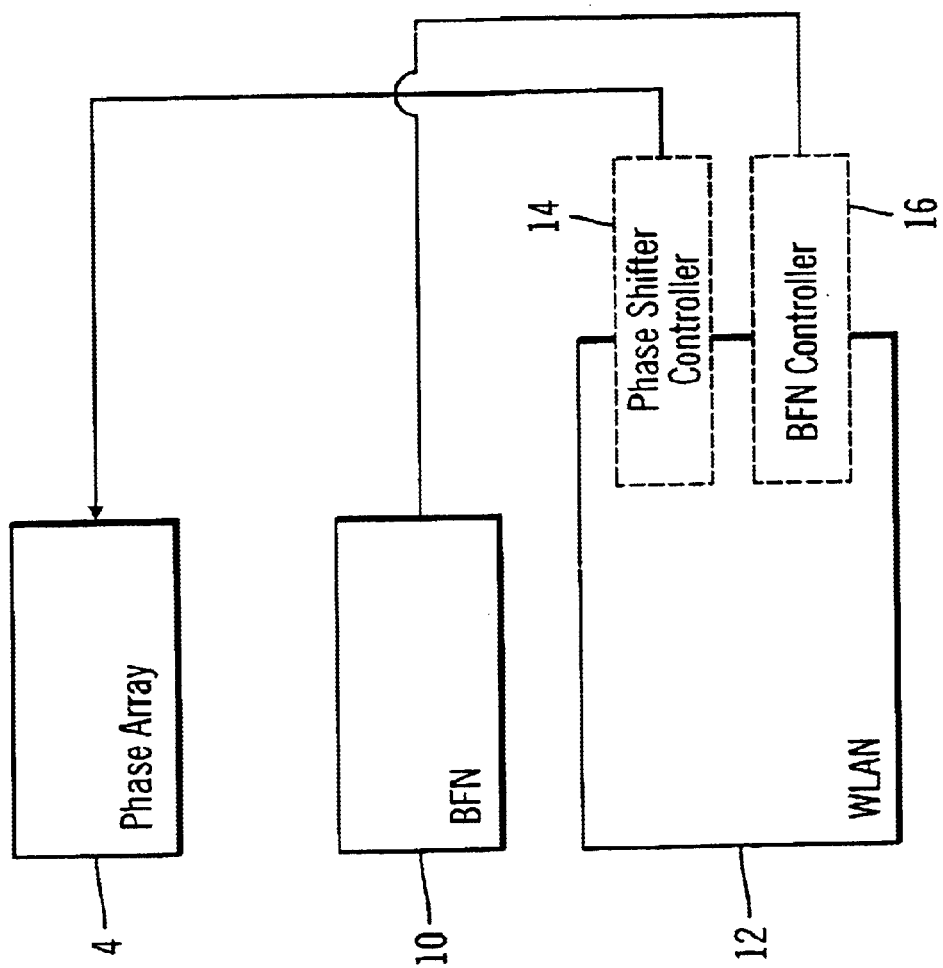
FIG. 7 is a schematic representation of an alternate embodiment of the antenna controller system.

Control Devices:

Looking to FIGS. 2 and 7, the phase shifter controller 14 and beam forming network controller 16 receive input or command data from the WLAN device. FIG. 7 shows an alternative embodiment of the phase shifter controller and beam forming network controller configure within WLAN device 12. Such integration of the controller devices in WLAN device 12 can be a function integration, such that through software or hardware implementations, WLAN device 12 performs the functions of phase shift controller 14 and beam forming network 16. Using this data plus additional processing operations (via DSP), each controller is respectively able to activate the appropriate RF switches in the smart antenna system for scanning and beam forming functions. Using the current configuration, the phase shifter controller 14 only receives commands and processes signals related to the phase array, and the beam forming network controller 16 only receives commands and processes signals related to the switches of the beam forming network. Each controller may also be configured to communicate with the other for additional system functionality, or as mentioned above, it is possible to configure one or both controllers together as a single controller element, or as elements of the WLAN device.

The particular system configuration of WLAN device and controller devices will vary given different system requirements, and it will be appreciated by those skilled in the art that such various configurations of the electronic control elements of the current smart antenna system do not affect the inventiveness of the phase array and beam forming network elements which have broad application to smart antenna systems in many devices. In general, for a given smart antenna system, the WLAN device (and associated controllers, whether configured as functional element of the WLAN device or as separate system control elements) receives incoming RF signals from the antenna array, processes the signals to determine signal direction, detects security ID in signals to lock correct signal and avoid interfering signals which are incident each antenna, sends control signals to each system element (switches), and generates outgoing communications signals which are transmitted out through the antenna array to directionally beam form.

System Timing/Processes:

The necessary operation and logic of switch operations for a particular antenna system will be easily determined by those skilled in the art given the ease of use and wide availability of RF switching components in the industry. In general the switches will be controlled by system control elements to beam form on the antenna(s) which correspond to directions of greatest signal strength. During an example system cycle, antenna array 6 will be scanned by the phase shifters 8 of phase array 4. Switch 102 is activated by the beam forming network controller (or WLAN device) to couple a port which corresponds to the first phase shifter of the system. Switch 424 coupled to the first phase shifter 42 is then selectively cycled through n ports (corresponding to the number of RF couplers in the phase shifter 42) so that phase components of the incoming signal from the first antenna element are successively routed through the switches 424 and 102 to WLAN device 12. WLAN device then sends a signal to beam forming network controller to activate switch 102 to couple the second phase shifter of the system. Once coupled, a switch 424 of the second phase shifter is then selectively cycled through n ports (once again corresponding to the number of RF couplers in the phase shifter) so that phase components of the incoming signal from the second antenna are successively routed through the second switch 424 and switch 102 to WLAN device 12. The process is then repeated until each phase shifter of the phase array has been scanned and phase components routed to the WLAN device for processing. It is also possible to implement control algorithms in the WLAN and/or control devices which alter the sequence of phase array scanning. For instance, an algorithm which successively scans antenna elements near a last known direction of greatest signal strength may be implemented to increase system speed and efficiency. Once the WLAN device has determined the direction of greatest signal strength based on scanned signal data from the phase array, an optimal beam formation signal and path is generated. Command signals from the WLAN device or sent to the phase shifter controller and beam forming network controller then activate switches 102, 424 and 423 such that the desired signal is routed first to the appropriate phase shifter, then through an appropriate RF coupler of the phase shifter, and finally out the desired antenna (having a phase component to effectuate directional beam pointing.) During the state when the system is beam forming, scanning of the phase array may be periodically performed to monitor signal strength and directionality using the above process. If the scanned signals indicate a directional change in signal, the system may then perform a beam forming process as detailed above to re-configure the switches of the beam forming network and phase array to correspond to the new direction of greatest signal strength.

In systems where it is desirable to form beams from more than one antenna simultaneously, switch 102 can be a multi-port switch (or multi-signal repeater) capable of sending outgoing signals from the WLAN device down more than one transmission line simultaneously. Optionally, two or more n-port switches may be used coupled to the WLAN device to direct outgoing signals to more than one antenna simultaneously for beam forming operations.

The system of the present invention has been described above in terms of functional modules in block diagram format. It is understood that unless otherwise stated to the contrary herein, one or more functions may be integrated in a single physical device or a software module in a software product, or one or more functions may be implemented in separate physical devices or software modules at a single location or distributed over a network, without departing from the scope and spirit of the present invention.

It is appreciated that detailed discussion of the actual implementation of each module is not necessary for an enabling understanding of the invention. The actual implementation is well within the routine skill of a programmer and system engineer, given the disclosure herein of the system attributes, functionality and inter-relationship of the various functional modules in the system. A person skilled in the art, applying ordinary skill can practice the present invention without undue experimentation.

While the invention has been described with respect to the described embodiments in accordance therewith, it will be apparent to those skilled in the art that various modifications and improvements may be made without departing from the scope and spirit of the invention. Accordingly, it is to be understood that the invention is not to be limited by the specific illustrated embodiments, but only by the scope of the appended claims.

What is claimed is:

1. An antenna system comprising:
   an antenna array for sending and receiving system signals;
   a phase array operatively connected to said antenna array and including a plurality of phase shifters that comprise discrete analog components for modifying the system signals, wherein the discrete analog components comprise slot couplers; and
   a beam forming network comprising means for routing the system signals, wherein the system signals are able to be selectively routed to and from the antenna elements to adjust beams formed by the antenna array to a desired direction.

2. The antenna system of claim 1, wherein one or more slot couplers are configured along one of said transmission lines which is attached to an individual antenna element.

3. The antenna system of claim 2, wherein the slot couplers configured along the transmission line are spaced evenly apart.

4. The antenna system of claim 3, wherein said spacing is a predetermined spacing.

5. The antenna system of claim 4, wherein said predetermined spacing corresponds to the wavelength of the system signals.

6. The antenna system of claim 1, wherein the system signals comprise analog signals.

7. The antenna system of claim 6, wherein the analog signals comprise RF signals.

8. The antenna system of claim 7, wherein the RF signals comprise incoming RF signals and outgoing RF signals.

9. The antenna system of claim 1, wherein the plurality of switches are selectively operated by the system control means to scan the incoming RF signals entering the phase array and to redirect outgoing RE signals from a first antenna element to a second antenna element.

10. The antenna system of claim 9, wherein said scanning involves selectively passing phase components of the phase array to the system control means for processing.

11. The antenna system of claim 10, wherein the processing function yields a direction of greatest antenna gain.

12. The antenna system of claim 11, wherein said redirection of outgoing RF signals accommodates the pointing of the antenna beam of the second antenna element in the direction of greatest gain.

13. A portable wireless communication processing system comprising the antenna system of claim 1 and a processing system for controlling the antenna system wherein the elements of said antenna system and processing system are configured in a portable device.

14. The portable wireless communication processing system as in claim 13, wherein the portable device is at least one of a notebook computer, personal digital assistant, and mobile phone.

15. The antenna system of claim 1 further comprising a system control means for processing system signals and interacting with said means for routing system signals.

16. The antenna system of claim 15, wherein said system control means includes a digital signal processor.

17. The antenna system of claim 1, wherein the antenna array comprises a plurality of antenna elements.

18. The antenna system of claim 17, wherein at least one of said antenna elements comprises a directional antenna which is able to form a beam in a plurality of directions.

19. The antenna system of claim 17, wherein the antenna elements comprise RF antennas.

20. The antenna system of claim 1, further comprising a plurality of transmissions lines connecting the antenna array, the phase array, and the beam forming network.

21. The antenna system of claim 20, wherein said transmission lines comprise RF transmission lines.

22. The antenna system claim 20, wherein said plurality of transmission lines are configured to accommodate multiple signal paths between the antenna array and the beam forming network.

23. The antenna system of claim 22, wherein said multiple signal paths and configured such that a series of individual signal paths extend from transmissions lines connected to each antenna element to a single transmission line of the beam forming network.

24. The antenna system of claim 1, wherein said means for routing system signals includes a plurality of switches, each said switch being selectively operable to allow or restrict passage of one or more system signals through the transmission lines of the beam forming network.

25. The antenna system of claim 24, wherein the switches comprise discrete analog switches.

26. The antenna system of claim 1, wherein the phase array includes a plurality of phase shifters for selectively passing phase components of the system signals.

27. A reconfigurable RF antenna system comprising:
   a system signal;
   an antenna array for sending and receiving said system signal;
   a phase array operatively connected to said antenna array comprising means for passing phase components of said system signal which comprises discrete analog components including slot couplers;
   a beam forming network operatively connected to said phase array and said antenna array comprising means for selectively routing said system signal; and
   a system control device for operating said means for selectively routing said system signal to reconfigure the antenna system.

28. A method of adjusting antenna beam components in a wireless communication system, comprising the steps of:
   forming an antenna array using a plurality of antenna elements to send and receive system signals;
   providing a phase array configured using a plurality of phase shift elements that comprise discrete analog components including slot couplers;
   configuring a beam forming network using a plurality of switches and transmission lines to form a plurality of signal paths; and
   selectively operating said switches to route said system signals along a desired signal path.

29. The method of claim 28, wherein said system signals, switches, and transmission lines comprise discrete analog components.

* * * * *